United States Patent Office 3,161,666
Patented Dec. 15, 1964

3,161,666
METHOD OF PRODUCING THIOCARBAMATES AND THIOCARBONATES
Frank J. Sowa, Cranford, N.J.
(305 E. 46th St., New York, N.Y.)
No Drawing. Filed Aug. 30, 1961, Ser. No. 134,813
12 Claims. (Cl. 260—455)

This application is a continuation-in-part of co-pending application Serial No. 734,423, filed May 12, 1958, and now abandoned.

This invention relates to methods for producing thiocarbamates and thiocarbonates and is directed particularly to reactions whereby a whole series of such compounds may be produced easily and economically.

In accordance with the methods described in co-pending application Serial No. 547,840, filed November 18, 1955, now Patent No. 2,834,799, carbamic and carbonate esters are produced by reactions between ureas and alcohols under the influence of boron trifluoride.

It has now been found that substantially the same type of reaction can be carried out when employing boron trifluoride or other deamminating agents when the reactants are ureas or thioureas and alkanols or mercaptans, at least one of which reactants contains sulfur. Those reactions which result in the formation of thiocarbamates may be represented by the following typical equations:

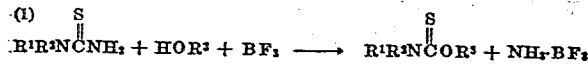

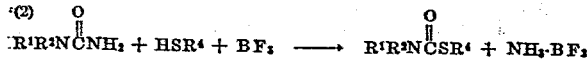

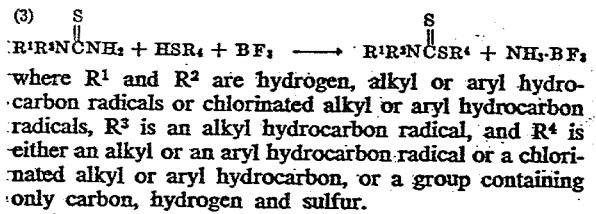

where $R^1$ and $R^2$ are hydrogen, alkyl or aryl hydrocarbon radicals or chlorinated alkyl or aryl hydrocarbon radicals, $R^3$ is an alkyl hydrocarbon radical, and $R^4$ is either an alkyl or an aryl hydrocarbon radical or a chlorinated alkyl or aryl hydrocarbon, or a group containing only carbon, hydrogen and sulfur.

Those reactions which result in the formation of thiocarbonates may be represented by the following equations:

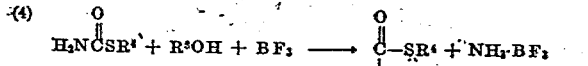

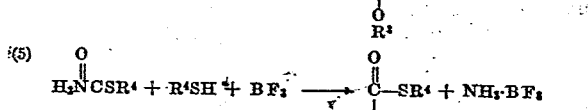

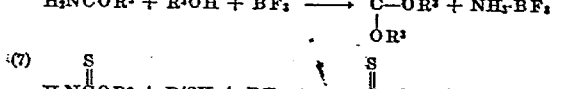

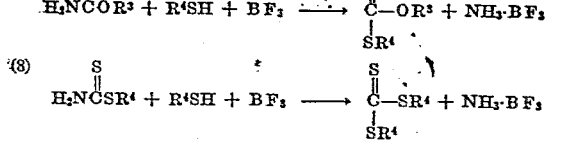

It is thus apparent that a great variety of carbonates may be produced such as alkyl or aryl thiol or dithiol carbonates and alkyl or aryl thiol alkyl thiocarbonates or dithiol thiocarbonates.

In view of the varied nature of the reactions which may be employed in carrying out the present invention, it will be apparent that the method is of a general character and may be employed in producing a whole series of thiocarbamates, thiolcarbamates, dithiocarbamates, as well as thiolcarbonates and thiocarbonates.

It is further possible to use various sources of boron trifluoride as deamminating agents in carrying out the foregoing reactions. For this purpose, such compounds as $NH_3 \cdot BF_3$; $NH_4 \cdot BF_4$; $RO \cdot BF_3$; or the urea boron trifluoride complexes of Patent No. 2,980,733. In the alternative, such deamminating agents as zinc chloride, tin chloride, ferric chloride, phosphorous trichloride, cuprous acetate and the like may be used. Nevertheless, for most purposes it is convenient to use gaseous boron trifluoride and to carry out the reaction in the presence of a liquid which may be a solvent for one or more of the reactants.

Accordingly, the principal object of the present invention is to provide novel methods for producing thiocarbamates and thiocarbonates.

Another object of the invention is to produce thiocarbamates and thiocarbonates under the influence of a deamminating agent.

A specific object of the invention is to carry out such processes while using boron trifluoride as the deamminating agent.

These and other objects and features of the present invention will appear from the following description thereof wherein typical methods and reactants are cited for the purpose of indicating the nature of the invention but without intending to limit the invention thereby.

In carrying out the methods of the present invention, substantially any thiourea which contains an $H_2N$— group may be used and any mercaptan may be employed. Moreover, when reacting thioureas with alcohols, substantially any alkanol may be used, whereas, when reacting ureas with mercaptans, either urea itself or any of those substituted ureas which contain an $H_2N$— group may be employed. Thus, the ureas and thioureas which may be employed may be represented by the formula

where X is either sulfur or oxygen and $R^1$ and $R^2$ are hydrogen or alkyl or aryl hydrocarbon radicals or chlorinated alkyl or aryl radicals.

Among the ureas which may be employed are urea itself and the mono- and unsymmetrical di-substituted ureas such as monomethyl urea, unsymmetrical dimethyl urea, and the corresponding ethyl, propyl, butyl, cyclohexyl, phenyl, tolyl, naphthyl, and benzyl ureas as well as the corresponding mono- and polychlorinated alkyl and aryl ureas.

Typical of the thioureas which may be employed are thiourea itself, monomethyl thiourea, unsymmetrical dimethyl thiourea, and the corresponding ethyl, propyl, butyl, cyclohexyl, phenyl, tolyl, naphthyl, benzyl thioureas and chlorinated alkyl and aryl thioureas such as mono- and dichlorophenyl thiourea and dichloroethyl thiourea.

Among the alkanols which may be used are methyl, ethyl, propyl, butyl, octyl and stearyl alcohols for example.

Typical mercaptans which may be used in carrying out the process are methyl, ethyl, propyl, butyl, phenyl, tolyl or benzyl mercaptan as well as long chain mercaptans such as dodecyl mercaptan. It is also possible to use mono- and polychlorinated alkyl and aryl mercaptans such as dichlorophenyl mercaptan or dichloroethyl mercaptan. Furthermore, dithio mercaptans such as 1,2-ethanedithiol may be used.

In general when carrying out the methods of the present invention, the urea or thiourea is dissolved in a solvent such as an alcohol or liquid mercaptan or the reactants may be dissolved or suspended in an inert liquid such as benzene or other hydrocarbon.

The reaction mixture is heated whereupon gaseous boron trifluoride may be bubbled into the solution. When a source of boron trifluoride such as monoammino boron trifluoride ($NH_3 \cdot BF_3$), ammonium fluoborate ($NH_4 \cdot BF_4$) or the complex urea $4 \cdot BF_3$ is used, it may be added to the mixture prior to heating. If other types of deamminating agents are used, they may be added either prior to or during the heating of the reaction mixture.

The temperature at which the reaction is carried out will depend upon the reactants employed and the end products to be obtained. Ordinarily, reaction temperatures of from 35 to 150° C. are employed in producing lower alkyl O-alkyl and S-alkyl carbamates and thiocarbamates. However, when using long chain or high boiling reactants or deamminating agents other than boron trifluoride, the temperature employed may be as high as 200° C. or more. However, it is found that some of the products formed during the reaction tend to decompose readily and under such circumstances, the reaction may be conducted under reduced pressure and correspondingly lower temperatures.

In order to illustrate typical procedures which may be employed in carrying out the present invention, the following examples are cited.

*Example I*

228 grams (3 mols) of thiourea were mixed with 420 grams (7 mols) of n-propanol and the mixture was heated to about 100° C. whereby all of the thiourea was dissolved. 119 grams (1.76 mols) of boron trifluoride were then bubbled into the solution over a period of 2 hours. At this time, an insoluble liquid was formed and rose to the top of the reaction flask. When separated and distilled, it was identified as n-propyl borate and distilled at about 172 to 175° C. The $NH_3 \cdot BF_3$ which was formed and collected in the lower portion of the flask was separated by filtering the hot solution. The filtrate was cooled to about 15° C. for 3 hours whereby 152 grams of n-propyl thionocarbamate was recovered. The product had a melting point of 35° C. The $NH_3 \cdot BF_3$ recovered weighed 92 grams after washing with hot n-propanol and drying.

*Examples II to V*

The method described above was repeated using 7 mols of methanol, ethanol, isopropanol and n-butanol, in place of the 7 mols of n-propanol of Example I. The products were isolated in yields of from 50 to 80% and the thionocarbamates were found to have the following melting points:

(II) Methyl—M.P. 41° C.
(III) Ethyl—Liquid at room temperature solid at 15° C.
(IV) Isopropyl—M.P. 80° C.
(V) n-Butyl—liquid at room temperature solid at 17° C.

*Example VI*

158.1 grams (1 mol) of N-cyclohexyl-thiourea were mixed with 230.3 grams (5 mols) of ethyl alcohol and the mixture heated until the N-cyclohexyl thiourea dissolved. 67.8 (1 mol) of gaseous boron trifluoride was then bubbled into the solution over a period of about 2 hours. 98 grams of ethyl-N-cyclohexyl thionocarbamate were thereby obtained and found to have a melting point of 50° C.

*Example VII*

The general procedure of Example I was used but 380 grams (5 mols) of n-propyl mercaptan were employed instead of the n-propanol of Example I, whereas 180 grams (3 mols) of urea were used in place of the thiourea of Example I. Upon completion of the reaction, n-propyl thiolcarbamate having a melting point of 91° C. was isolated in a yield of 60% of theory.

*Example VIII*

The process of Example VII was repeated substituting thiourea for the urea previously employed whereby a 63% yield of n-propyl dithiocarbamate was obtained.

*Example IX*

170.5 grams (1 mol) of N-3-chlorophenylurea and 761.5 grams of 1-propanethiol were added to a three liter, three-necked, round-bottomed flask fitted with a mechanical stirrer, a reflux condenser and an inlet tube and thermometer.

Boron fluoride gas was added while stirring and maintaining the temperature between 50° C. and 70° C. After 67 grams of boron fluoride had been adsorbed, the addition was stopped and the contents refluxed for one hour.

The reaction mixture was cooled to room temperature, filtered to remove the ammonia-boron fluoride complex and the latter solid was extracted with hot propanol and filtered. The filtrates from above were combined and distilled to remove the propanol and 1-propanethiol. The residue was recrystallized and proved to be propyl N-3-chlorophenylthiolcarbamate with a melting point of 78–85° C. The yield of

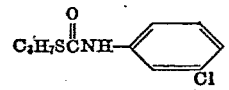

was 200.6 grams (87% of theoretical).

The weight of ammonia-boron fluoride recovered was 80 g.

*Example X*

The above experiment was repeated except that 122.5 grams (1 mol) of N-2-chloroethylurea was used in place of N-3-chlorophenylurea.

The yield of propyl N-2-chloroethylthiolcarbamate was 146 grams (80% of theoretical). The product was a liquid at room temperature and distilled at 110–115° C. (10 mm.).

*Example XI*

137.5 grams (1 mol) of N,N-dipropylurea and 372.8 grams (6 mols) of ethanethiol was added to a three-necked flask equipped as described under Example IX above. After adding 35 grams of anhydrous zinc chloride to the reaction mixture, stirring was started while heating the contents by a heating mantel. As the temperature rose, ammonia was evolved and the temperature range was between 30° C. and 70° C. Most o fthe amomnia that was formed combined with the excess ethanethiol and the ammonia was evolved at higher temperatures by decomposition of this product. Some of the ethanethiol was evolved with the ammonia even though the temperature of the condenser was kept well below the boiling point of the ethanethiol.

The zinc chloride is removed from the reaction product by washing with dilute hydrochloric acid. The product was a liquid with an index of refraction of 1.4772 (25° C.) and density 0.958 (25° C.). The yield of product ethyl N,N-dipropylthiolcarbamate was 180 grams (95% of theoretical).

By carrying out the processes described above but continuing the introduction of $BF_3$ into the reaction mixture until at least one molar equivalent of $BF_3$ based on the urea or thiourea used, it is found that alkyl thiocarbonates are formed. The yield of the carbonates increases as the amount of boron trifluoride used is increased until about 2 mol equivalents of the $BF_3$ have reacted.

The foregoing reactions are found to be general in character. Thus, by varying the alcohol or alkyl mercaptan and the urea or thiourea employed, the whole series of thiol- and thionocarbonates can be produced as indicated by the equations Nos. 4 to 8 set forth above.

*Example XII*

60 grams (1 mol) of urea were added to 248 grams (4 mols) of ethyl mercaptan and gaseous boron trifluoride was bubbled into the reaction flask until 136 grams (2 mols) of BF₃ had been taken up in the reaction. In this way, 109 grams of diethyl, dithiol carbonate were obtained which was a yellowish liquid having a boiling point of 196° C. The yield amounted to 65% of theory.

If desired, any of the carbamates produced in accordance with Examples I to VIII can be separated from the reaction mixture and mixed with an alkanol or a mono- or dithio-mercaptan. The resulting mixture may then be further reacted with BF₃ or another deamminating agent, as a separate operative step to produce the desired thiocarbonate. It will, of course, be apparent that the carbamates employed in producing thiocarbonate compounds in accordance with the present invention may be produced by other methods or derived from any other source desired.

*Example XIII*

105.2 grams (1 mol) of ethyl thiolcarbamate and 372.8 grams (6 mols) of ethyl mercaptan (ethanethiol) were weighed in a two liter, three-necked, round-bottomed flask. The flask was equipped with a mechanical stirrer, reflux condenser and an inlet tube and thermometer in the third neck.

The contents were stirred and boron fluoride was added slowly while maintaining the temperature between 35°–50° C. After 68 grams of boron fluoride was added, the contents were refluxed for three hours.

After the contents had cooled to room temperature it was filtered. The ammonia-boron fluoride complex was washed with isopropyl alcohol and added to the filtrate. There was formed 83 grams of the solid ammonia-boron fluoride complex.

The filtrate was distilled, first collecting the unreacted ethyl mercaptan and then the isopropyl alcohol. The residue was distilled under reduced pressure of 10 mm whereupon there was collected a main fraction boiling at around 90°–100° C. which upon redistillation at atmospheric pressure distilled at 195°–197° C. and was diethyl dithiolcarbonate

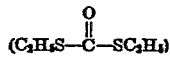

$$(C_2H_5S-\overset{O}{\underset{\|}{C}}-SC_2H_5)$$

The yield of the diethyl dithiolcarbonate was 136 grams (90% of the theoretical).

*Example XIV*

The above experiment was repeated except that 105.2 grams (1 mol) of ethyl thionocarbamate was used in place of the ethyl thiolcarbamate and 256 grams (6 mols) of ethanol was used in place of ethanethiol.

There was isolated from this reaction 81 grams of solid ammonia-boron fluoride and 114.8 grams (85% theoretical) of diethyl thionocarbonate

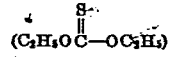

$$(C_2H_5O\overset{S}{\underset{\|}{C}}-OC_2H_5)$$

which distilled at 50°–60° C. (10 mm.).

In this way, substantially any of the thio type carbonates can be produced by simple reaction procedures depending upon the reactants selected for carrying out the process.

In general, as indicated above, the amount of the carbonates formed increases as the amount of the boron trifluoride or the other deamminating agent is increased. However, in most instances, some of the carbonates are formed in producing the carbamates and, conversely, some of the carbamates may be present in the reaction mixture when forming the carbonates, particularly if the deamminating agent is less than two molar equivalents based on the amount of urea or thiourea employed. Nevertheless, it is generally possible to separate the end products by distillation, crystallization or other methods of purification.

In some instances, and particularly when using high boiling reactants, the reaction mixture may be heated. On the other hand, the process is exothermic when gaseous boro trifluoride is used and the addition of further heat is seldom necessary. In fact, the reaction mixture often must be cooled to prevent loss of the end product by decomposition, rearrangement, or otherwise.

While the invention has been described above with particular reference to typical reactions and procedures, the examples cited have been chosen for the purpose of indicating the general nature of the application and are not intended to limit the scope of the invention.

I claim:

1. The method of producing a thio compound which is an ester of carbamic acid which comprises the steps of mixing together a compound having the formula HXR where X is selected from the group consisting of sulfur and oxygen and R is selected from the group consisting of alkyl and aryl hydrocarbon groups, mono- and polychlorinated alkyl and aryl hydrocarbon groups and groups containing only hydrogen, carbon and sulfur, with a urea compound having the formula

$$R^1R^2N\overset{X}{\underset{\|}{C}}NH_2$$

where R¹ and R² are selected from the group consisting of hydrogen, alkyl and aryl hydrocarbon groups and mono- and polychlorinated alkyl and aryl hydrocarbon groups, and X is selected from the group consisting of sulfur and oxygen one of which compounds in the mixture contains sulfur, and heating said mixture in the presence of not more than one mol of a deamminating agent selected from the group consisting of boron trifluoride, zinc chloride, tin chloride, ferric chloride phosphorous trichloride and cuprous acetate, based on the weight of the urea compound employed.

2. The method of producing a thio compound which is an ester of carbonic acid which comprises the steps of mixing together a compound having the formula HXR where X is selected from the group consisting of sulfur and oxygen and R is selected from the group consisting of alkyl and aryl hydrocarbon groups, mono- and polychlorinated alkyl and aryl hydrocarbon groups and groups containing only hydrogen, carbon and sulfur, with a urea compound having the formula

$$R^1R^2N\overset{X}{\underset{\|}{C}}NH_2$$

where R¹ and R² are selected from the group consisting of hydrogen, alkyl and aryl hydrocarbon groups and mono- and polychlorinated alkyl and aryl hydrocarbon groups, and X is selected from the group consisting of sulfur and oxygen one of which compounds in the mixture contains sulfur, and heating said mixture in the presence of a molar excess of a deamminating agent selected from the group consisting of boron trifluoride, zinc chloride, tin chloride, ferric chloride, phosphorous trichloride and cuprous acetate, based on the weight of the urea compound employed.

3. The method of producing a thiocarbonate which comprises the steps of mixing a thiolcarbamate with a compound selected from the group consisting of an alkanol and mono- and dithio mercaptans, and reacting a deamminating agent selected from the group consisting of boron trifluoride, zinc chloride, tin chloride, ferric chloride, phosphorous trichloride and cuprous acetate with the mixture at a temperature of about 35° C. to 200° C.

4. The method of producing a thiocarbonate which comprises the steps of mixing a thiolcarbamate with a compound selected from the group consisting of an alkanol and mono- and dithio mercaptans, and reacting boron trifluoride with the mixture at a temperature of about 35° C. to 200° C.

5. The method of producing an alkylthio carbamate which comprises reacting boron trifluoride with a mixture containing an alkyl mercaptan and urea while maintaining the reaction mixture at a temperature of about 35° C. to 200° C., the amount of boron trifluoride used being not greater than the molar equivalent of the urea employed.

6. The method of producing an alkyl thionocarbamate which comprises reacting boron trifluoride with a mixture containing an alkanol and thiourea while maintaining the reaction mixture at a temperature of about 35° C. to 200° C., the amount of said boron trifluoride used being not greater than the molar equivalent of the thiourea employed.

7. The method of producing an alkyl thionocarbamate which comprises reacting a deamminating agent selected from the group consisting of boron trifluoride, zinc chloride, tin chloride, ferric chloride, phosphorous trichloride and cuprous acetate with a mixture containing an alkanol and thiourea, said thiourea containing an $NH_2$— group and a hydrocarbon group, while maintaining the reaction mixture at a temperature of about 35° C. to 200° C., the amount of said deamminating agent used being not greater than the molar equivalent of the thiourea employed, and thereafter separating the alkyl thionocarbamate produced from the reaction mixture.

8. The method of producing an alkyl thionocarbamate which comprises reacting boron trifluoride with a mixture containing an alkanol and thiourea, said thiourea containing an $NH_2$— group and a hydrocarbon group, while maintaining the reaction mixture at a temperature of about 35° C. to 200° C., the amount of said boron trifluoride used being not greater than the molar equivalent of the thiourea employed.

9. The method of producing an alkyl dithiocarbamate which comprises reacting boron trifluoride with a mixture containing an alkyl mercaptan and thiourea while maintaining the reaction mixture at a temperature of about 35° C. to 200° C., the amount of said boron trifluoride used being not greater than the molar equivalent of the thiourea employed.

10. The method of producing an alkyl dithiocarbamate which comprises reacting boron trifluoride with a mixture containing an alkyl mercaptan and thiourea, said thiourea containing an $NH_2$— group and a hydrocarbon group, while maintaining the reaction mixture at a temperature of about 35° C. to 200° C., the amount of said boron trifluoride used being not greater than the molar equivalent of the thiourea employed.

11. The method of producing alkylthio carbonates which comprises reacting boron trifluoride with a mixture containing an alkyl mercaptan and urea while maintaining the reaction mixture at a temperature of about 35° C. to 200° C., and continuing the reaction until more than one molar equivalent of boron trifluoride based on the urea has been taken up in the reaction.

12. The method of producing an alkylthio thionocarbonate which comprises reacting boron trifluoride with a mixture containing an alkyl mercaptan and thiourea while maintaining the reaction mixture at a temperature of about 35° C. to 200° C. and continuing the reaction until more than one molar equivalent of the boron trifluoride based on the thiourea has been taken up in the reaction.

References Cited in the file of this patent

UNITED STATES PATENTS 2,834,799   Sowa _____ May 13, 1958

OTHER REFERENCES

Wagner and Zook: "Synthetic Organic Chemistry" (1953), page 827.